UNITED STATES PATENT OFFICE.

SAMUEL H. BROWN, OF BOSTON, MASSACHUSETTS.

BATH FOR ANNEALING METALS.

SPECIFICATION forming part of Letters Patent No. 465,156, dated December 15, 1891.

Application filed December 22, 1890. Serial No. 375,509. (No specimens.)

*To all whom it may concern:*

Be it known that I, SAMUEL H. BROWN, a citizen of the United States, residing at Boston, in the county of Suffolk and State of Massachusetts, have invented certain new and useful Improvements in Baths for Annealing Metals; and I do hereby declare the following to be a full, clear, and exact description of the invention, such as will enable others skilled in the art to which it appertains to make and use the same.

This invention relates to the treatment of iron, particularly low-grade iron or steel, whereby it may be annealed and toughened at a very small expense.

My invention consists in uniting certain acids and salts in such proportions that the metal at a low red heat, when plunged in it, shall be annealed and toughened, the latter effect being produced by means of oxidizing agencies.

This annealing-bath is composed, preferably, of chromic acid or bichromate of potash. One ingredient may be substituted for the other, since they are employed for the oxygen which they contain; also, cyanic acid or cyanide of potash, silica, aluminum, and carbonate of sodium. In a bath containing one hundred parts, the above-mentioned substances are compounded in the following proportions: thirty per cent. of chromic acid, fifteen per cent. of cyanide of potash, forty-five per cent. of silica, five per cent. of alumina, and five per cent. of carbonate of sodium. To the above-mentioned mixture water is added in the proportion of about sixteen pounds of water to one pound of the mixture.

In the compounding of this bath I do not desire to be limited to the precise proportions here designated, as they may be varied somewhat, according to the quality of metal to be treated.

The action of this bath in annealing iron or soft steel is as follows: The metal is first heated to a low red heat and then plunged into the solution, from which it is at once withdrawn. The act of heating to a low red heat has a tendency to produce a full anneal, driving out the oxygen from the mass, which, when plunged into the bath, is more fully softened and toughened by the action of the alumina and silica combined. After this action the chromic acid or bichromate of potash having thrown off oxygen, said oxygen, now contained in the bath, acts upon the metal to harden it exteriorly. The proportions of the substances aluminum and silica may be varied to some extent, dependent upon the amount of carbon contained in the metal to be treated. Through the agency of the cyanic acid a species of case-hardening is obtained which is not brittle, since the exterior only of the mass is affected, while the interior portion remains soft and unannealed. The carbonate of sodium is added to increase the effect of the oxidizing agencies.

What I claim is—

A bath for annealing metals, composed of chromic acid or its equivalent, bichromate of potash, cyanic acid or its equivalent, cyanide of potash, silica, alumina, carbonate of soda, and water, in substantially the proportions stated.

In testimony whereof I affix my signature in presence of two witnesses.

SAMUEL H. BROWN.

Witnesses:
  H. E. LODGE,
  FRANCIS C. STANWOOD.